J. Sperry.
Saw Swage.
No. 85,770.
Patented Jan. 12. 1869.

Witnesses:
Wm H. Steel
Jno. B. Harding

Inventor:
J. Sperry
By Henry Howson
Attorney

United States Patent Office.

JOSEPH SPERREY, OF PHILADELPHIA, PENNSYLVANIA, ASSIGNOR TO HENRY DISSTON, OF SAME PLACE.

Letters Patent No. 85,770, dated January 12, 1869.

IMPROVEMENT IN SWAGE FOR SAW-TEETH.

The Schedule referred to in these Letters Patent and making part of the same.

*To all whom it may concern:*

Be it known that I, JOSEPH SPERREY, of Philadelphia, Pennsylvania, assignor to HENRY DISSTON, have invented an Improved Swage for Upsetting the Points of Saw-Teeth; and I do hereby declare the following to be a full, clear, and exact description of the same.

My invention consists of a swage in which one or more wedge-shaped dies, with bevelled corners, are adapted to angular recesses formed by the slotted end of a stem, and a ferrule, all substantially as described hereafter.

The objects of my invention are—

First, the cheap and ready manufacture of the instrument;

Second, facilities for the easy withdrawal and replacing of the dies; and

Third, the self-maintenance of the instrument in the best condition for imparting the proper well-defined shape and sharp point to the saw-tooth.

In order to enable others skilled in the art to make and use my invention, I will now proceed to describe its construction and operation, reference being had to the accompanying drawing, which forms a part of this specification, and in which—

Figure 2:
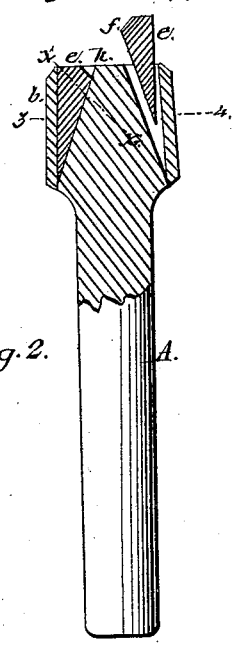
Figure 1:
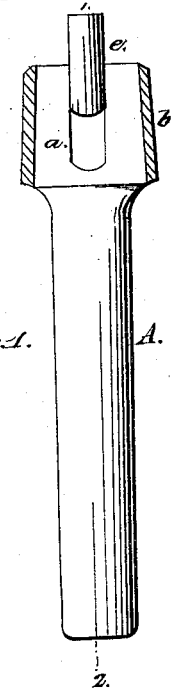
Figure 3:
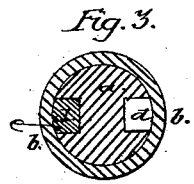
Figure 4:
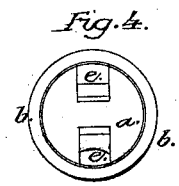

Figure 1 is a side view, partly in section, of my improved swage for saw-teeth;

Figure 2, a longitudinal section on the line 1–2, fig. 1;

Figure 3, a section on the line 3–4, fig. 2;

Figure 4, an end view of the swage; and

Figure 5:
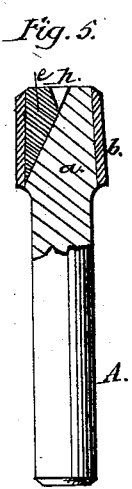

Figure 5, a modification of my invention.

Similar letters refer to similar parts throughout the several views.

On reference to figs. 1, 2, 3, and 4, A represents the stem of the swage, on one end of which is a cylindrical enlargement, $a$, to the exterior of which is fitted the ferrule $b$, both enlargement and ferrule being made slightly tapering, so that the latter can be driven tightly into the former.

In the enlargement $a$ are cut the two opposite-inclined slots $d$, so that, when the ferrule is fitted to its place, two angular recesses are presented for the reception of the two wedge-shaped dies, $e$ $e$, as shown in fig. 2.

Each die is cut away at one corner, $f$, so that, when fitted into its place, an annular recess, $h$, is presented, and it is this recess which is adjusted to the point of a saw-tooth, while a succession of blows are given to the end of the stem A until the point of the tooth is upset to an extent and shape determined by that of the said angular recess $h$.

It will be understood that the instrument is made of steel, and that both the dies and the enlargement $a$ are properly hardened.

My improved swage possesses several advantages:

First. It is easily manufactured, the enlargement being turned with the dies in their recesses, both being thus readily adapted to the ferrule.

Secondly. The dies can be easily removed after detaching the ferrule, and as readily replaced, thus affording facilities for the regrinding of the bevelled corners when they have become worn by repeated use; and this grinding may be repeated until much of the die has been worn away, care being taken, however, to retain the proper inclination of the said bevelled corner $f$. This will be understood by the dotted line $x$ $x$, which shows the extent to which the die may be reduced without detracting from the efficacy of the instrument.

Thirdly. The tendency of the blows imparted to the instrument, when applied to a saw-tooth, is to drive the dies, owing to their wedge-like form, tight into their recesses. Hence the corner of the angular recess $h$ is always maintained in that sharp condition necessary to impart the desired sharp edge to the tooth.

In the modified instrument shown in fig. 5, but one die is shown. It is desirable, however, to have two or more dies of different widths, so that the instrument can be used to upset teeth of different character.

I claim as my invention, and desire to secure by Letters Patent—

A saw-swage, in which one or more wedge-shaped dies are inserted in angular recesses formed by slotting the end of the stem A, and are secured by ferrule $b$, all substantially as and for the purpose described.

In testimony whereof, I have signed my name to this specification, in the presence of two subscribing witnesses.

JOSEPH SPERREY.

Witnesses:
A. H. SHOEMAKER,
JOHN G. BAKER.